G. M. STEPHEN.
STEAM-COOKER.
No. 184,307. Patented Nov. 14, 1876.
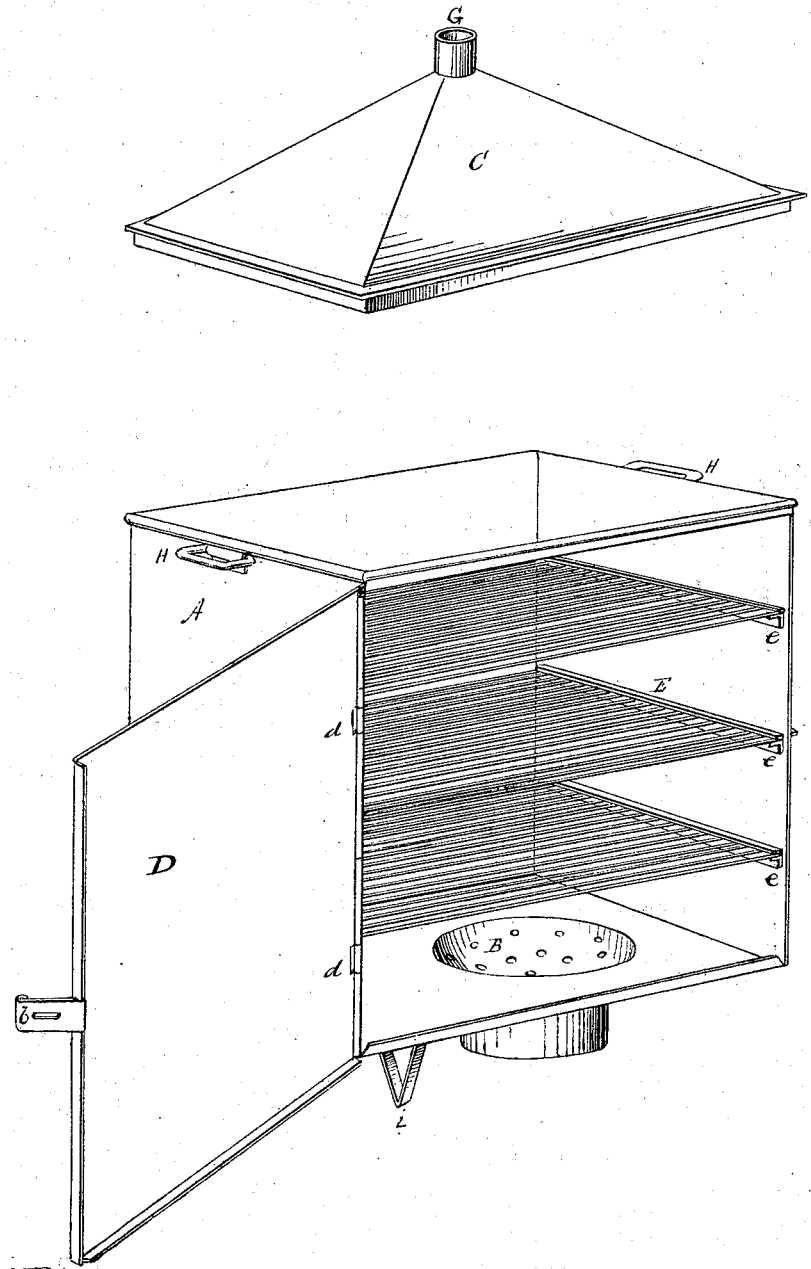
Witnesses:
C. Clarence Poole
Will H. Moxon
Inventor:
George M. Stephen
per atty.
A. H. Evans & Co.
Washington D.C.

UNITED STATES PATENT OFFICE.

GEORGE M. STEPHEN, OF MINNEAPOLIS, MINNESOTA.

IMPROVEMENT IN STEAM-COOKERS.

Specification forming part of Letters Patent No. 184,307, dated November 14, 1876; application filed April 4, 1876.

*To all whom it may concern:*

Be it known that I, GEORGE M. STEPHEN, of Minneapolis, Minnesota, have invented certain new and useful Improvements in Steam-Cookers, of which the following is a full, clear, and exact description, reference being had to the accompanying drawings, making a part of this specification, in which the figure is a perspective view with the top removed and the door opened, showing the internal construction.

The object of my invention is to produce a steam cooking utensil which will cook a large quantity of food in proportion to the steam-supply, and have a convenient means for changing within it the relative location of the food being cooked.

My invention consists of certain details of construction, combined as an article of manufacture, as hereinafter specifically described and claimed.

To enable others skilled in the art to make and use my invention, I will proceed to describe the exact manner in which I have carried it out.

In the said drawings, A is a rectangular sheet-metal box, having in its bottom, near one side, the hemispherical perforated steam-opening B and a removable peaked top, C. One side of this receptacle is hinged at *d*, forming a door, and it has a catch, *b*, to fasten it when closed. Running back from the door, along the sides of the steamer, are ribs *e e*, for the support of a series of wire or perforated trays, E, which are intended to hold the food. The bottom is provided with two legs, *i i*, to keep the steamer level when the hemispherical perforated steam-opening is not in the pot. At the point of the peaked roof is a pipe, G, which may be connected with the stove-pipe to carry off all unpleasant odors. Handles H H are provided near the upper edge, for convenience in carrying.

The advantage in having the steam-opening B at one side of the center of the bottom is, that the steamer can be so placed that it will interfere with no other utensil that may be adjacent to it on the stove or range. The shape of the roof is such as to conduct all the moisture down the sides.

The wire trays enable the servant to cook several kinds of food at the same time, and by placing the stronger food at the top it will impregnate none of the others. Through the door the trays can be removed or their places changed at will.

Having thus described my invention, what I claim as new, and desire to secure by Letters Patent, is—

As a new article of manufacture, steam-cooker A, provided with a removable top, C, the steam-opening B, one side the center of the bottom, legs *i*, a door, D, the ribs *e*, and the wire trays, substantially as set forth.

GEORGE M. STEPHEN.

Witnesses:
J. R. HILGEDICK,
G. S. HASELTINE.